Patented Jan. 10, 1933

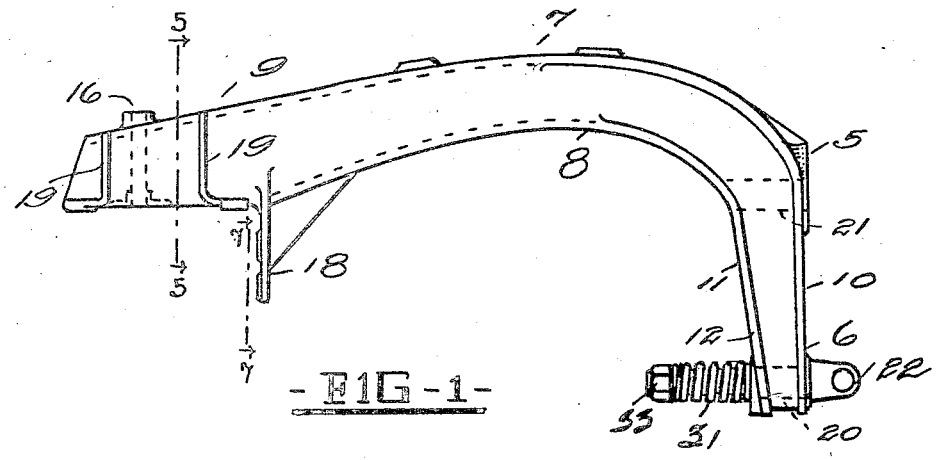
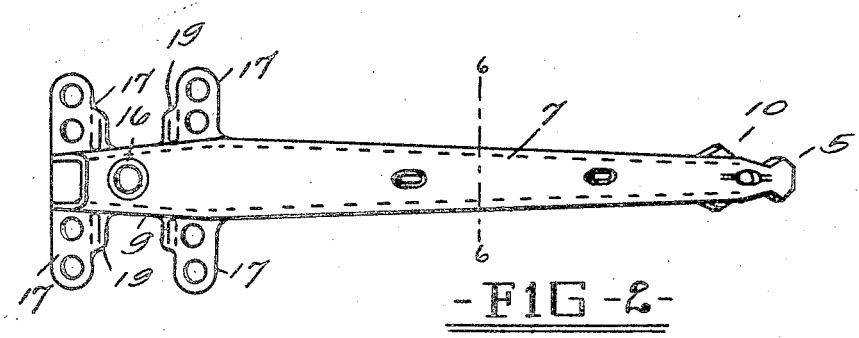
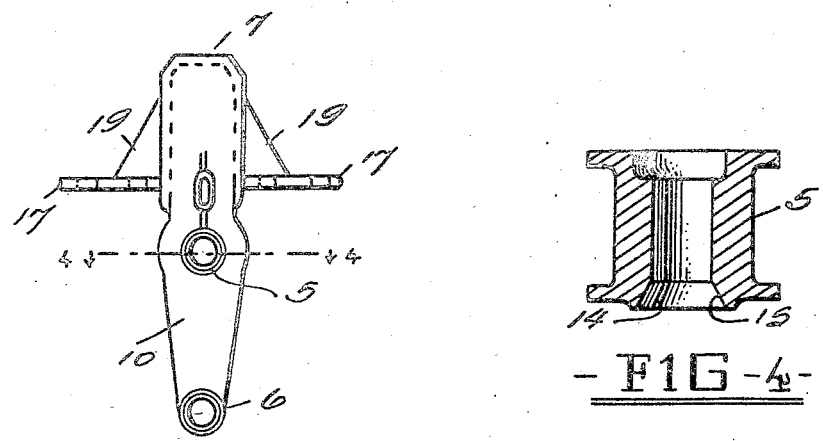

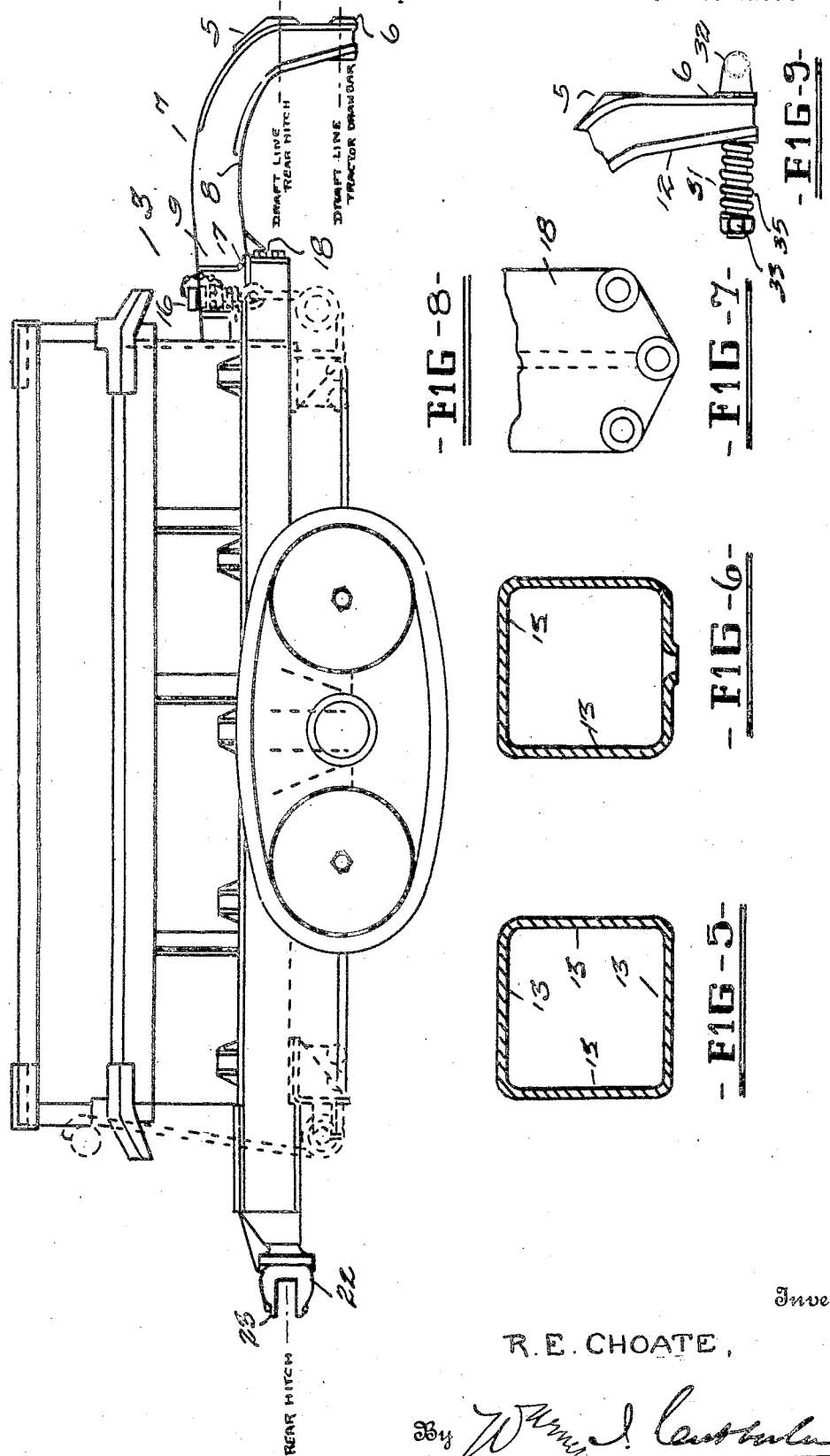

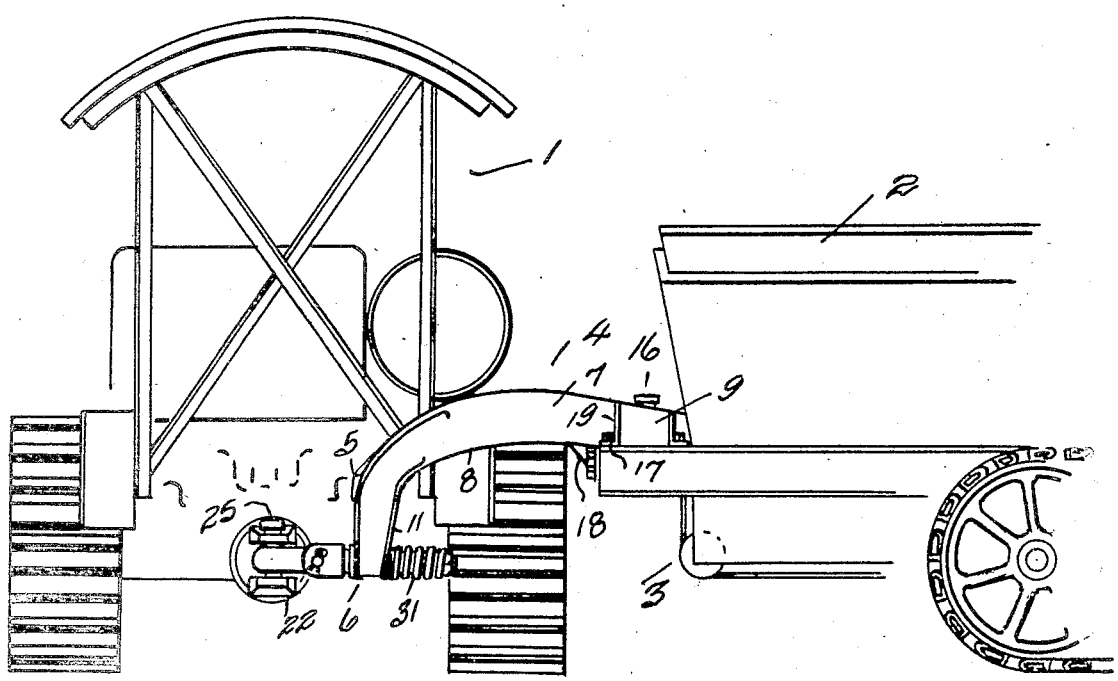
FIG-10-
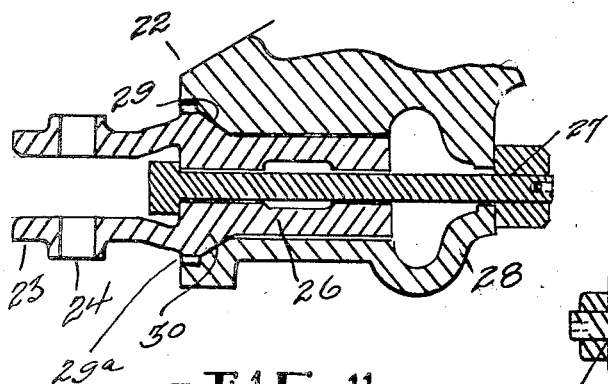
FIG-11-
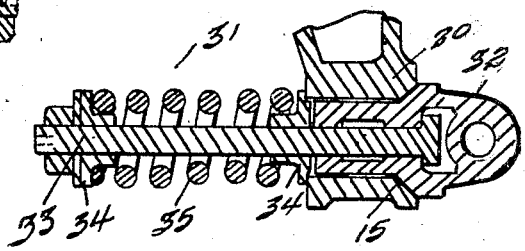
FIG-12-

1,893,983

UNITED STATES PATENT OFFICE

ROY E. CHOATE, OF CEDAR RAPIDS, IOWA

DRAFT APPLIANCE

Application filed April 7, 1931. Serial No. 528,410.

My present invention, in its broad aspect, has to do with improvements in draft appliances of the type adapted for use with trailers, and the like, either singly or in train, and more particularly it is my purpose to provide a draft appliance which will afford the necessary clearance to premit full turning of a tractor with respect to a trailer hitched thereto, and one which embodies hitch means both in line with the draft when in train, both fore and aft, and below the fore and aft draft line, for single operation as a trailer to a tractor.

It is old and well-known in the art to provide plural hitch means in conjunction with a pull bar, or the like. As early as 1885, a clevis device with hitch means at variable elevations was used as exemplified by Patent #314,443 to Forbes. In 1914 DuBois provided variable height hitches as shown in his Patent #1,493,970, and in 1919 Ten-Broeck used a variable level hitch with a tractor coupling, see his Patent #1,318,819. So also is it old to provide fore and aft hitches in line with the normal draft in train, and hitches above and below the fore and aft line of draft, as see Skonnard, #1,423,164, and as far back as 1918, Potts described fore and aft hitches in line with the draft in train, and a hitch (a hook) below the line of draft, as see his Patent #1,255,222. It is also old to arch-up a draw bar or hitch device to afford clearance so that a leading vehicle may be turned properly as evidenced by the patents to Pescatore, #1,084,820; Townsend, #1,377,609, and Deming #1,466,274. My present invention, however, is an improvement on all of these prior developments in the art, and the principal novel features of construction and advantages over the prior art may be briefly defined as follows:—

First, I provide a one-piece reinforced arched casting which affords not only a high degree of strength to both lateral and line loads, but when used as a draft tongue affords sufficient clearance to permit full swing of a tractor therebeneath—clearing the grousers of the tractor irrespective of the position, tilt, or vibration of the trailing vehicle; second, I provide an attaching device or frame member integral with the tongue for fixing the tongue upon the frame or chassis front bar of a trailer, thereby eliminating weak joints and the like; third, I provide in conjunction with and integral with the tongue at its fore end, a depending clevis, or hitch bar, so that there is no possibility of loose joints between the hitch bar or clevis and the tongue; in other words, all of the several parts of my draft appliance are contained in an integral, one-piece, casting; fourth, the clevis or hitch bar is sloped off instead of being perfectly vertical, so that when a trailer starts to rise in front (as in passing over a ditch) the back of the leading vehicle or tractor will not strike the upright back portion or bind; fifth, the cross-sectional construction of the casting is a hollow rectangle, or box construction, this in conjunction with the one-piece integral conception attains the greatest rigidity and strength for the material used; and sixth, the underside of the tongue part is fully arched or given a marked curve, so that there are no square corners or the like to catch in the grousers of a leading tractor, especially when turning on uneven ground.

My present invention, furthermore, contemplates the provision of a unique rear draw bar, having a center pull. The construction of the draw bar is box-like, and the pulling point is in direct line and parallel with the line of force on the main frame and almost pulling in the center of the main frame. It has heretofore been the practice to have a hitch point a little lower than the main frame, but this has a tendency to twist off in hard pulls. My present invention remedies this condition, and the entire construction of the rear hitch is greatly improved and rendered more durable, less likely to bind and also less likely to twist off. It has been found in practice that when a tractor is turned in bad places or backed up, that the strain exerted by the trailer will break-off more pull bar bolts and jaws than anything else, and my present device remedies these defects and is greatly improved in every way and affords greater clearance so that the tractor can be turned at a sharp angle, thus making it possible to operate a tractor and trailer hitched together in a very narrow fill.

Other and equally important objects and advantages of my invention will be apparent as its detailed construction is more fully disclosed hereinafter, but the foregoing will tend to point out those main features of novelty that I wish to emphasize.

In the drawings wherein my invention is illustrated:—

Figure 1 is a side elevation of the same.
Figure 2 is a top plan view.
Figure 3 is a front end view.
Figure 4 is a view on the line 4—4 of Figure 3.
Figure 5 is a view on the line 5—5 of Figure 1.
Figure 6 is a view on the line 6—6 of Figure 2.
Figure 7 is a view on the line 7—7 of Figure 1.
Figure 8 is a side view of a trailer provided with my improved hitches.
Figure 9 is a view of a spring compensated coupling.
Figure 10 is a view of a tractor and trailer hitched together, the tractor being substantially at right angles to the trailer. This view also shows substantially the position of the draft line and the manner in which my arched tongue affords the necessary clearance.
Figure 11 is a section through the rear hitch and
Figure 12 is a section through my spring compensated coupling.

In the drawings wherein like characters of reference are used to designate like or similar parts throughout the several views:—

The numeral (1) is a diagrammatic view of the rear end of a leading tractor; (2) the trailer next to the tractor; these vehicles form no part of my invention, but are shown to illustrate its general application in Figure 10. My device is designed to be carried by the trailing vehicle (2); that is, to be attached to the forward end (3) of a trailer, and my draft appliance assembly is generally designated by the numeral (4); the upper hitch (5) being in line with the fore and aft draft line of a train, and the lower hitch (6) being designed to couple a single trailer with a tractor.

My invention comprises a single one-piece casting forming the attaching frame, tongue and clevis or hitch bar of a draft appliance.

The tongue portion (7) has a full arch or upward curve, especially on the under side (8) rising from the attaching frame (9) and continuing down to, and gradually falling off into the clevis or hitch bar (10); the rear edge or face (11) of the clevis or hitch bar is slanting or sloped forward and down as at (12); the curve line from the arched tongue into the slanting or sloped face being unbroken.

As shown in Figure 5, my one-piece casting is of box-construction, having four relatively parallel walls (13) and a hollow center. In Figure 4, the opening (14) for the pull bar, is shown, and it has marked beveled walls (15) to give a fillet to the pull bar to form a seat. This construction is especially rigid and strong and affords a maximum resistance both to longitudinal and lateral distortion, and it will not crack or break off.

The attaching frame (9) is integral with the tongue (7), and is in reality merely the butt of the tongue, there being provided two pairs of spaced lateral ears (17) to receive other bolts for attaching the tongue to the top of the trailer frame front bar (not shown) or to the top of the transverse forward chassis bar. There is a depending reinforced leg (18) for attachment by bolts or the like to the breast or front face of said frame front bar. This construction of the attaching frame has been found to afford the maximum resistance to strain, pull, and the like, and is very simple. My tongue, by means of this frame, may be attached to any conventional vehicle construction. The ears (17) are reinforced at (19). The tongue, frame, and clevis or hitch bar, are cast with a core in a well-known manner.

The clevis or hitch bar (10) is also box construction and its inner edge or face (11) slants forwardly and downwardly as previously described. At the lowermost end of the clevis is an opening or receiving a lower pull jaw. The lower hitch jaw opening is designated (20) and is designed for use when the trailer is coupled with a tractor, not in train. Other hitches may be provided. The upper hitch opening (21) is directly in line with the normal draft line of the trailers in train, i. e. the draft line of the fore and aft hitches.

Referring now to Figures 9, 10, 11 and 12, it will be seen that the jaws (23) of my rear hitch (22) have openings (24) therethrough to receive the coupling bolt (25). The jaws (23) are integrally formed with a substantially cylindrical shank (26) which is bored to receive the bolt (27) which engages the rear frame (28). The frame (28) is countersunk as at (29) to form a seat for the enlarged substantially conical shoulder to the forward end of the shank (26). A lug (29a) is cast above and below the pullbar opening to prevent the jaw (23) from rotating in hole (29).

My spring compensated coupling (31), which is shown in Figure 12 in conjunction with the lower hitch jaw opening (20), contemplates the use of a chrome, nickel steel pullbar jaw (32) through which the bolt (33) extends. The base of the pullbar jaw is conical or beveled to seat on the beveled walls (15) to give a fillet, thereby preventing wear in backing up when pressure is in a backward thrust and which also occurs in going downhill. The bolt (33) carries abutment washers (34) between which the spring (35) is retained. There is a swivel connection afforded by the bolt (33) and the pullbar jaw (32). The load is taken by the spring (35) and side-thrusts and twisting action necessarily encountered in the transportation of a wagon behind a tractor is compensated for and the possibility of breaking pullbar jaws and pullbar bolts is largely removed.

In Figure 10, the position of the tractor is shown substantially at right angles to that of the following trailer and it will be seen that the arched construction of the underside (8) of the tongue affords a desired clearance over the grousers.

It is believed that the operation and principal advantages of my one-piece integral draft appliance is apparent from the foregoing, but the use of the full stiff arched tongue, with the butt forming the attaching frame, and the inside curve of the tongue carried out in modified degree with the sloping face of the clevis or hitch bar is again emphasized. This construction, in practice, has proved practical and efficient, and desirable from every point of view and much more desirable than other similar appliances now on the market.

Since there may be minor changes in shape and construction without departing from the spirit and scope of this invention, it is pointed out that interpretation of the invention should only be conclusive when made in the light of the subjoined claims.

I claim:—

1. A one piece, integral casting to be used as a draft appliance for use in connecting leading vehicles with tractors, trailers, or succeeding trailers, comprising an integral fully arched tongue part, and an integral attaching frame at the butt end thereof, an integral depending hitch bar at the forward end of said tongue having means in line with the draft for attaching a coupling, and means below the normal draft line for attaching another coupling, the inner face of said hitch bar being sloped down and forwardly, and curved at its upper part to be symmetrical with the curve of the under part of the tongue, said tongue and hitch bar being integral.

2. A one piece, integral casting to be used as an arched draft appliance comprising a tongue having an attaching frame at its butt end, and a forward depending hitch bar, the inner or rear face of which is sloped downwardly and forwardly, and the upper portion of said inner face being curved into the under face of the tongue in symmetrical outline, said casting and its several above named parts being of hollow, rectangular construction in cross section.

In testimony whereof, I affix my signature hereunto.

R. E. CHOATE.